United States Patent [19]

Pedersen

[11] Patent Number: 4,533,262
[45] Date of Patent: Aug. 6, 1985

[54] TRIMETALLIC BEARINGS

[75] Inventor: James R. Pedersen, Schenectady, N.Y.

[73] Assignee: General Electric Company, Schenectady, N.Y.

[21] Appl. No.: 649,870

[22] Filed: Sep. 12, 1984

Related U.S. Application Data

[60] Division of Ser. No. 534,263, Sep. 21, 1983, which is a continuation of Ser. No. 297,810, Aug. 31, 1981, abandoned.

[51] Int. Cl.³ .................. F16C 17/02; F16C 37/00
[52] U.S. Cl. ........................ 384/420; 308/DIG. 14
[58] Field of Search ............ 384/306, 278, 277, 276, 384/307, 309, 420, 425; 308/DIG. 14

[56] References Cited

U.S. PATENT DOCUMENTS 4,277,113  7/1981  Heshmat .................. 308/DIG. 14

FOREIGN PATENT DOCUMENTS 1393880  5/1975  United Kingdom ....... 308/DIG. 14
2062365  5/1981  United Kingdom ....... 308/DIG. 14

Primary Examiner—Lenard A. Footland
Attorney, Agent, or Firm—Paul Checkovich; John F. Ahern

[57] ABSTRACT

For use in a pressure fed or flood lubricated bearing, there is disclosed a shaft load-bearing element (e.g., the thrust plate in a tapered land thrust bearing) preferably comprising three metallic layers including an inner layer adjacent the shaft surface of metal possessing good bearing properties; an outer layer of structural steel to provide rigidity; and an intermediate layer of copper or copper alloy sandwiched between the inner and outer layers to provide good thermal properties. The metallic layers of such a trimetallic bearing element are metallurgically bonded at the interfaces between layers to enhance heat transfer. Advantageously, a shaft load-bearing element according to the invention is substantially free from distortion and damage during handling and avoids elevated temperature problems. A load-bearing element according to the invention may be fabricated as a tilting pad for use in a journal bearing, as a thrust plate for a tapered land thrust bearing, or as a tilting shoe for a thrust bearing.

6 Claims, 3 Drawing Figures

TRIMETALLIC BEARINGS

This is a division of application Ser. No. 534,263, filed Sept. 21, 1983, which is a continuation of application Ser. No. 297,810, filed Aug. 31, 1981, now abandoned.

BACKGROUND OF THE INVENTION

Various kinds of flood lubricated bearings for a rotating shaft are known in which the shaft loading is sustained by a bearing pad or shoe in contact with the shaft through an intervening oil film. The present invention is related to improvements in these shaft load-bearing elements, overcoming problems of distortion and other damages which can occur with previous bearings unless special, careful handling is provided.

For many years it has been common practice to use steel backed, babbitted thrust bearings to carry the axial load in large rotary machines such as steam driven turbine-generator sets. More recently, to overcome problems of extreme temperatures, copper-backed babbitted bearing plates and shoes have been used. With its greatly superior thermal conductivity, the use of copper has reduced substantially the peak temperatures developed in the babbitt during machine operation.

Unfortunately, copper is a relatively soft material and thrust plates, bearing shoes, and so forth manufactured according to this technique have been prone to warpage even while in storage. Furthermore, these copper backed parts have been particularly susceptible to damage during handling and shipping. These problems have become more acute over the years as a trend toward larger machines has necessitated the use of correspondingly larger bearings. For example, in a large steam turbine of current vintage, thrust bearings may be on the order of three feet in diameter.

One solution, for minimizing distortion in pivoted thrust shoes, has been to use a higher strength copper alloy such as chromium-copper. However, even this has not been entirely successful and has increased the bearing cost considerably.

Another potential solution to the problem, particularly for thrust bearings, is exemplified by the pad construction disclosed by U.S. Pat. No. 3,829,180 in which a graphite-fiber composite material is applied to a steel backing plate. The facing material is said to insulate the bearing pad from oil-shear heat and to thereby reduce the tendency toward distortion. However, such tilting pad construction has not found utility in large rotating machinery such as steam turbine-generator sets.

Accordingly, it is an object of the present invention to provide a load-bearing element for a flood lubricated bearing which is rugged, free from long term distortion acquired during storage, substantially free from damage acquired during handling, and which avoids the elevated temperature problems inherent in steel backed load-bearing parts.

SUMMARY OF THE INVENTION

These and other objects are attained in pressure fed or flood lubricated bearings by providing a shaft load-bearing element (e.g., the thrust plate in a tapered land thrust bearing) preferably having an inner layer adjacent the shaft surface of metal possessing good bearing properties (including a low coefficient of friction), an outer layer of structural steel to provide rigidity, and an intermediate layer of copper or copper alloy sandwiched between the inner and outer layers to provide good thermal properties. The metallic layers of such trimetallic bearing element are preferably bonded metallurgically at the interfaces between layers to enhance heat transfer. A load-bearing element according to the invention may be fabricated as a tilting pad for use in a journal bearing, as a thrust plate for a tapered land thrust bearing, or as a pivoted shoe for a thrust bearing.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
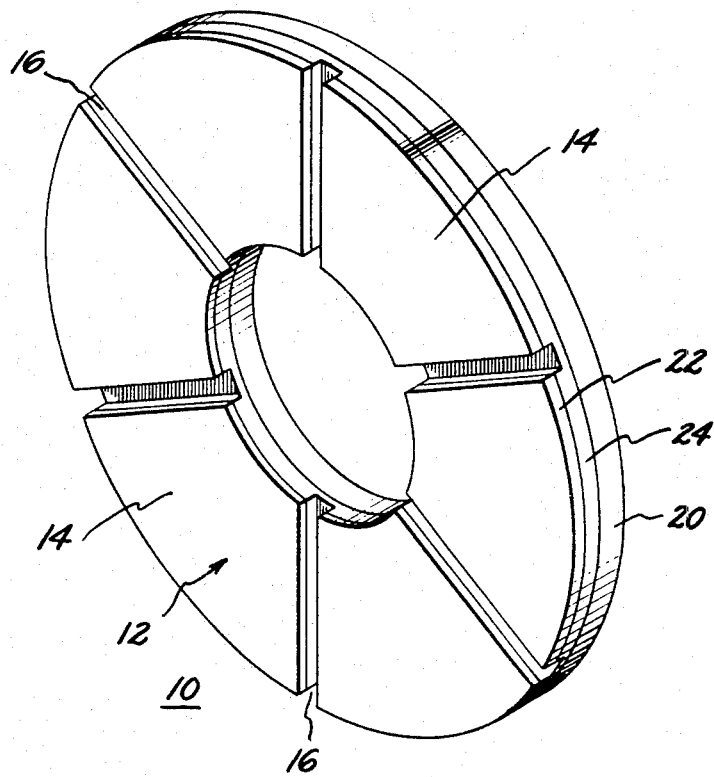
FIG. 1 is a perspective view of a tapered-land thrust plate for a thrust bearing according to the invention.

FIG. 1 illustrates, according to the invention, a tapered land thrust plate, designated generally as 10, in which the bearing surface 12 is divided into a plurality of pads 14 separated by an equal number of oil feed grooves 16. In a conventional manner, each pad 14 is tapered in a circumferential and radial direction so that the motion of the adjacent bearing surface, or runner, (not illustrated) will wipe oil into an intervening wedge shaped film and build up load carrying oil pressures. In use, the thrust plate 10 is retained by a housing and receives therein a continuous supply of lubricating oil to facilitate bearing operation. However, for clarity these well known elements are omitted from FIG. 1.

To deal with the aforementioned problems of distortion and damage while providing good thermal properties for maintaining an even temperature distribution throughout the bearing surface 12, the thrust plate 10 preferably comprises an outer layer 20 of steel providing structural rigidity; an inner bearing surface layer 22 of babbitt metal; and an intermediate layer 24 of copper or copper alloy sandwiched between the inner and outer layers, 22 and 20 respectively, serving generally as a thermal shunt for maintaining all of the tapered land pads 14 at substantially the same temperature. Most preferably, the thickness of the inner layer is less than that of the intermediate layer 24 which, in turn, is less than the thickness of the outer layer 20. This relationship provides an optimal combination based on considerations of cost, heat handling capabilities, and structural fidelity. The terms "inner" and "outer" refer to the relative proximity of inner layer 22 and outer layer 20 to the shaft runner surface.

As the direct load-bearing element of a thrust bearing, a thrust plate, such as thrust plate 10, is continuously subjected to heat frictionally generated in the oil wedge film by the rotating shaft. Additionally, localized heating, potentially great enough to cause permanent damage to a thrust plate, can occur if the oil wedge breaks down at some point on the bearing surface and the shaft runner comes into direct contact with the bearing metal, a phenomenon commonly referred to as "wiping". In the thrust plate 10 of FIG. 1 these problems are minimized since the copper, or copper alloy, of the intermediate layer 24 distributes the heat substantially evenly to all of the tapered land pads 14 from which it is transferred to the lubricating oil. Localized heating is rapidly dissipated, avoiding extreme temperature spikes that may occur in one or more of the pads 14.

To maintain continuity of the intermediate layer 24 and to assure an even temperature distribution, particularly in the inner layer 22, the oil feed grooves 16 are not so deep as to divide the intermediate layer 24 into separate segments. Oil feed grooves 16 are, nevertheless, provided with sufficient volume to insure a continuous flow of oil.

Fabrication of a satisfactory thrust plate, for example, according to the invention is obtained by providing a steel base layer of approximately 11/16" and approximately ⅜" of copper cladding over the steel. About 3/16" of babbitt metal is then applied to the copper to serve as the bearing surface. The copper to steel bond may be made by such well known techniques as roll bonding or explosive bonding. Copper clad steel of appropriate thickness to serve as the intermediate and outer layers of a thrust plate, for example, is also available commercially from E. I. Du Pont De Nemours & Company under the trademark of DETACLAD Plate. The babbitt metal inner layer is applied to the copper intermediate layer by conventional methods such as by casting or welding. Application of babbitt by metal inert gas (MIG) welding is the preferred method, providing a superior metallurgical bond. In any case, it is preferable to avoid mechanical bonding between the metallic layers (such as by interlocking dovetail connections) since such bonds tend to create temperature gradients and require use of extra babbitt metal at the expense of copper.

Figure 2:
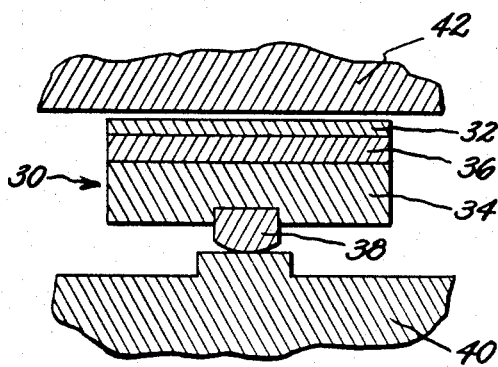
FIG. 2 is a cross-sectional view of a pivoted thrust pad according to the invention, for a pivoted shoe thrust bearing.

FIG. 2 illustrates an embodiment of the invention in a tilting pad for a pivoted shoe thrust bearing. As is well known, the pivoted shoe thrust bearing differs from the tapered land thrust bearing of FIG. 1 in that each pad is an individual plate which is free to tilt about a pivot point. Thus, the load-bearing element, or tilting pad, 30 is preferably comprised of an inner layer 32 of babbitt metal, an outer layer 34 of steel, and an intermediate layer 36 of copper or copper alloy fabricated according to the methods described above for fabrication of a tapered land thrust plate. It is preferred to have the relative thicknesses of the three layers bear the relationship described above for a tapered land thrust plate. That is, the outer layer has the greatest thickness and the inner layer has the least. The pivot 38 is a hardened spherical surface, and one such pivot is inserted behind each pad in a conventional manner. The pivots, such as pivot 38, are free to pivot upon housing frame member 40. A shaft runner 42 is in proximity to the inner layer 32 of the tilting pad 30.

Figure 3:
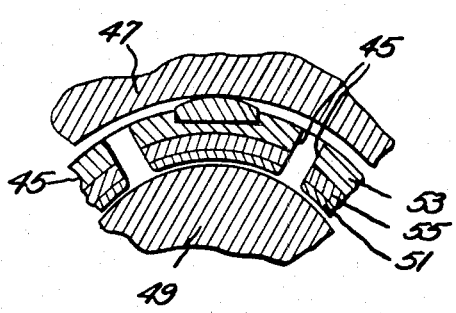
FIG. 3 is a cross-sectional view of a segment of a tilting pad journal bearing in which the bearing pads are in accordance with the present invention.

Another embodiment of the invention, for a tilting pad journal bearing is illustrated in FIG. 3. Tilting pad journal bearings are of course well known and consist of individual pad segments such as segment 45 retained within a housing 47 in a surrounding relationship to a rotating shaft 49. Each pad 45 is restrained from movement by conventional means (not illustrated) and is free to tilt into proper relationship to the rotating shaft 49. According to the invention, each tilting pad 45 comprises an inner layer 51 of bearing metal, preferably babbitt; an outer layer 53 of structurally rigid metal, preferably steel; and an intermediate layer 55 of metal having good thermal conductivity, preferably copper or an alloy of copper. Each trimetallic pad, such as pad 45, is bonded together according to the aforementioned methods and is enabled with good structural rigidity, with freedom from distortion, and with a substantially even temperature distribution throughout during shaft rotation.

While there has been shown and described what is considered preferred and alternative embodiments of the invention, it is understood that various other modifications may be made therein. For example, although babbitt metal is generally preferred as the inner layer or bearing surface of a trimetallic bearing according to the invention, it will be apparent that other metals, such as alloys of aluminum, possessing good bearing properties (e.g., low coefficient of friction) may be utilized instead. It is intended to claim all such modifications which fall within the true spirit and scope of the present invention.

The invention claimed is:

1. In a flood lubricated bearing associated with a rotatable shaft, a load-bearing element for minimizing localized peak temperatures, comprising:

an inner metallic layer having a bearing face for carrying a mechanical load transmitted from an adjacent portion of said shaft to said bearing face through an intervening lubricant film;

an outer metallic layer; and an intermediate metallic layer having higher thermal conductivity than both said inner and outer layer, respectively, said intermediate layer sandwiched between and metallurgically bonded to said inner and said outer layer and effective to maintain a substantially even temperature distribution throughout said inner layer, wherein said outer metallic layer has greater structural rigidity than both said inner and intermediate layer, respectively; wherein the thickness of said inner layer is less than the thickness of said intermediate layer and the thickness of said intermediate layer is less than the thickness of said outer layer; and wherein such load-bearing element is fabricated as a thrust plate for a tapered land thrust bearing.

2. A load-bearing element as in claim 1 wherein said inner layer is selected from the group consisting of alloys of aluminum and babbitt metal, said outer layer is steel, and said intermediate layer is selected from the group consisting of copper and copper alloy.

3. A flood lubricated bearing for a rotatable shaft, said bearing effective for minimizing localized peak temperatures, comprising:

an inner layer of bearing having a bearing surface for carrying a mechanical load transmitted from an adjacent portion of said shaft to said bearing surface through an intervening lubricant film;

an outer layer of metal; and an intermediate layer of metal sandwiched between said inner and said outer layer, said intermediate layer effective to maintain a substantially even temperature distribution throughout said inner layer, and said intermediate layer having a higher thermal conductivity than both said inner and outer layer, respectively, wherein said outer metallic layer has greater structural rigidity than both said inner and intermediate layer, respectively; and wherein said bearing is a tapered land thrust bearing.

4. A thrust bearing according to claim 3 wherein said inner layer of said thrust plate is babbitt metal, said outer layer of said thrust plate is steel, and said intermediate layer of said thrust plate is selected from the group consisting of copper and copper alloy.

5. A thrust bearing according to claim 4 wherein said intermediate layer is metallurgically bonded to said inner and outer layers.

6. A flood lubricated bearing as in claim 3, wherein said outer layer is thicker than said intermediate layer and said intermediate layer is thicker than said inner layer.

* * * * *